US010289763B2

(12) United States Patent
Otsuki et al.

(10) Patent No.: US 10,289,763 B2
(45) Date of Patent: May 14, 2019

(54) ESTIMATION DEVICE, ESTIMATION METHOD, AND NON-TRANSITORY COMPUTER READABLE MEDIUM

(71) Applicant: KABUSHIKI KAISHA TOSHIBA, Tokyo (JP)

(72) Inventors: Tomoshi Otsuki, Kanagawa (JP); Hideyuki Aisu, Kanagawa (JP); Mikito Iwamasa, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 301 days.

(21) Appl. No.: 15/069,305

(22) Filed: Mar. 14, 2016

(65) Prior Publication Data

US 2016/0275222 A1 Sep. 22, 2016

(30) Foreign Application Priority Data

Mar. 20, 2015 (JP) ................................ 2015-058652

(51) Int. Cl.

*G06F 17/50* (2006.01)
*G06F 17/18* (2006.01)
*F24F 11/30* (2018.01)
*F24F 11/62* (2018.01)
*F24F 11/46* (2018.01)

(52) U.S. Cl.

CPC .......... *G06F 17/5009* (2013.01); *G06F 17/18* (2013.01); *G06F 17/5004* (2013.01); *F24F 11/30* (2018.01); *F24F 11/46* (2018.01); *F24F 11/62* (2018.01); *G06F 2217/78* (2013.01)

(58) Field of Classification Search

USPC .......................... 703/2, 5, 19; 700/291, 295
See application file for complete search history.

(56) References Cited

U.S. PATENT DOCUMENTS 7,216,021 B2 5/2007 Matsubara et al.
8,457,923 B2 6/2013 Ohkubo
(Continued)

FOREIGN PATENT DOCUMENTS

JP 2002-259508 9/2002
JP 2002-267235 9/2002
(Continued)

*Primary Examiner* — Thai Q Phan
(74) *Attorney, Agent, or Firm* — Finnegan, Henderson, Farabow, Garrett & Dunner, L.L.P.

(57) ABSTRACT

According to one embodiment, an estimation device includes a first parameter generator, an energy simulator, a cost calculator, and a parameter selector. The first parameter generator determines values of one or more constituents of one or more first parameters to generate the one or more first parameters, the one or more constituents representing an operation status of a facility. The energy simulator calculates estimation information of energy consumption related to the first parameters by simulating energy consumption of the facility based on the first parameters. The cost calculator calculates evaluation values of the first parameters based on the estimation information of the energy consumption of the facility and actual performance information of the energy consumption of the facility. The parameter selector selects one of the plural first parameters based on the evaluation values.

10 Claims, 13 Drawing Sheets

COST
200
100
0
POWER CONSUMPTION PER PERSON
100
250
15
20
25
30
35
SET TEMPERATURE
$S_1$ $S_2$ $S_3$ $S_4$ $S_5$ $S_6$

START
S201 OPERATION INFORMATION GENERATOR GENERATES OPERATION INFORMATION
S101 OPERATION PARAMETER GENERATOR OBTAINS OPERATION INFORMATION AND GENERATES OPERATION PARAMETER S1
n=1; n≦Nmax; n++
S102 ENERGY SIMULATOR GENERATES ESTIMATED ENERGY INFORMATION
S103 COST CALCULATOR CALCULATES EVALUATION VALUE
S104 OPERATION PARAMETER GENERATOR GENERATES NEXT OPERATION PARAMETER Sn+1
S105 OPTIMUM OPERATION PARAMETER SELECTOR SELECTS OPTIMUM OPERATION PARAMETER
S106 OUTPUT CIRCUIT OUTPUTS OPTIMUM OPERATION PARAMETER, ETC.
END

(56) References Cited

U.S. PATENT DOCUMENTS

| | | | | |
|---|---|---|---|---|
| 2008/0046387 | A1* | 2/2008 | Gopal | G01D 4/004 705/412 |
| 2010/0057416 | A1* | 3/2010 | Peterman | G06F 17/5004 703/6 |
| 2013/0338842 | A1* | 12/2013 | Inoue | G06Q 10/06 700/291 |
| 2014/0143179 | A1 | 5/2014 | Takaoka et al. | |
| 2014/0365180 | A1* | 12/2014 | Lam | G06F 17/5004 703/1 |
| 2015/0178633 | A1* | 6/2015 | ElBsat | G06F 17/16 706/14 |
| 2016/0092986 | A1* | 3/2016 | Lian | G06Q 30/08 700/295 |
| 2016/0246268 | A1* | 8/2016 | ElBsat | G06F 17/16 |

FOREIGN PATENT DOCUMENTS

| | | | |
|---|---|---|---|
| JP | 2003-70163 | | 3/2003 |
| JP | 2005-90780 | | 4/2005 |
| JP | 2005-158020 | A | 6/2005 |
| JP | 3783929 | | 6/2006 |
| JP | 2011-165152 | A | 8/2011 |
| JP | 2013-65087 | A | 4/2013 |
| JP | 2014-164393 | | 9/2014 |
| WO | WO 2015/004742 | A1 | 1/2015 |

* cited by examiner

| OPERATION ITEM | ASSUMED PATTERN |
|---|---|
| AVERAGE SET TEMPERATURE OF AIR CONDITIONING (℃) | 26、27、28 |
| POWER CONSUMPTION PER PERSON (W) | 30 TO 300 |
| POPULATION VARIATION PATTERN | MORNING CONCENTRATION TYPE, NIGHT CONCENTRATION TYPE, ALL-DAY UNIFORM TYPE |
| ... | |

FIG. 2A

| ASSUMED PATTERN | 0:00 | 1:00 | ... | 8:00 | 9:00 | 10:00 | 11:00 | 12:00 | 13:00 | 14:00 | 15:00 | 16:00 | 17:00 | 18:00 | 19:00 | ... | 23:00 |
|---|---|---|---|---|---|---|---|---|---|---|---|---|---|---|---|---|---|
| MORNING CONCENTRATION TYPE | 0 | 0 | ... | 20 | 25 | 25 | 25 | 20 | 5 | 5 | 5 | 5 | 5 | 3 | 0 | ... | 0 |
| NIGHT CONCENTRATION TYPE | 0 | 0 | ... | 1 | 3 | 5 | 6 | 6 | 15 | 20 | 20 | 20 | 20 | 17 | 7 | ... | 0 |
| ALL-DAY UNIFORM TYPE | 0 | 0 | ... | 15 | 15 | 20 | 20 | 20 | 20 | 20 | 20 | 20 | 20 | 20 | 15 | ... | 0 |
| ... | | | | | | | | | | | | | | | | | |

FIG. 2B

| CONSTITUENT | VALUE |
|---|---|
| TYPE OF AIR CONDITIONING | VRF (VARIABLE REFRIGERANT FLOW) |
| NORMAL OUTPUT POWER OF AIR CONDITIONING kW | 5 |
| APERTURE AREA m2 | 30 |
| GROSS FLOOR AREA m2 | 120 |
| HEAT PENETRTION RATE W/(m2K) | 0.82 |
| ... | |

FIG.3A

| ITEM | 0:00 | 1:00 | ... | 8:00 | 9:00 | 10:00 | 11:00 | 12:00 | 13:00 | 14:00 | 15:00 | 16:00 | 17:00 | 18:00 | 19:00 | ... | 23:00 |
|---|---|---|---|---|---|---|---|---|---|---|---|---|---|---|---|---|---|
| OUTSIDE AIR TEMPER-ATURE | ... | ... | ... | 6.3 | 5.8 | 7.8 | 6.7 | 6.6 | 5.6 | 8.1 | 7.9 | 8.5 | 3.3 | 4.8 | 4.4 | ... | ... |
| WEATHER | ... | ... | ... | SUNNY | SUNNY | SUNNY | SUNNY | SUNNY | SUNNY | SUNNY | CLOUDY | CLOUDY | CLOUDY | CLOUDY | CLOUDY | ... | ... |

FIG.3B

| ACTUAL PERFORMANCE OF POWER | 0:00 | 1:00 | ... | 8:00 | 9:00 | 10:00 | 11:00 | 12:00 | 13:00 | 14:00 | 15:00 | 16:00 | 17:00 | 18:00 | 19:00 | ... | 23:00 |
|---|---|---|---|---|---|---|---|---|---|---|---|---|---|---|---|---|---|
| 2015/2/1 | 0 | 0 | ... | 6.3 | 5.8 | 7.8 | 6.7 | 6.6 | 5.6 | 8.1 | 7.9 | 8.3 | 3.3 | 4.8 | 4.4 | ... | 0 |
| 2015/2/2 | 0 | 0 | ... | 5.5 | 5.9 | 7.4 | 6.2 | 6.5 | 6.1 | 7.8 | 7.9 | 8.5 | 5.7 | 5.3 | 4.3 | ... | 0 |
| ... | | | | | | | | | | | | | | | | | |
| AVERAGE IN FEBRUARY | 0 | 0 | ... | 5.7 | 6.2 | 7.4 | 6.4 | 6.6 | 6.0 | 8.0 | 7.9 | 8.2 | 5.4 | 4.9 | 4.4 | ... | 0 |

FIG. 4

| ITEM | CONSTITUENT 1 | CONSTITUENT 2 |
|---|---|---|
| | SET TEMPERATURE OF AIR CONDITIONING | POPULATION VARIATION PATTERN |
| OPERATION PARAMETER 1 (COMBINATION PATTERN 1) | 28°C | MORNING CONCENTRATION TYPE |
| OPERATION PARAMETER 2 (COMBINATION PATTERN 2) | 28°C | NIGHT CONCENTRATION TYPE |
| OPERATION PARAMETER 3 (COMBINATION PATTERN 3) | 28°C | ALL-DAY UNIFORM TYPE |
| OPERATION PARAMETER 4 (COMBINATION PATTERN 4) | 26°C | MORNING CONCENTRATION TYPE |
| OPERATION PARAMETER 5 (COMBINATION PATTERN 5) | 26°C | NIGHT CONCENTRATION TYPE |
| OPERATION PARAMETER 6 (COMBINATION PATTERN 6) | 26°C | ALL-DAY UNIFORM TYPE |

FIG. 5

| OPERATION PARAMETER | SET TEMPERATURE (15°C TO 35°C) | POWER CONSUMPTION PER PERSON (100 W TO 250 W) | EVALUATION VALUE |
|---|---|---|---|
| $S_1$ | 20 | 200 | 200.3 |
| $S_2$ | 23 | 120 | 180.3 |
| $S_3$ | 28 | 130 | 55.2 |
| $S_4$ | 30 | 150 | 145.3 |
| $S_5$ | 27 | 170 | 182.4 |
| $S_6$ | 29 | 110 | 78.8 |
| ... | | | |

| ITEM | SET TEMPER-ATURE PATTERN | POPULA-TION PATTERN | 0 | 1 | ... | 8 | 9 | 10 | 11 | 12 | 13 | 14 | 15 | 16 | 17 | 18 | 19 | ... | 23 |
|---|---|---|---|---|---|---|---|---|---|---|---|---|---|---|---|---|---|---|---|
| OPERATION PARAMETER 1 | 28°C | MORNING CONCENT-RATION TYPE | 0 | 0 | ... | 1.5 | 7.1 | 8.4 | 9.9 | 8.3 | 2.1 | 2.0 | 1.9 | 1.8 | 1.6 | 0.9 | 0.0 | ... | 0 |
| OPERATION PARAMETER 2 | 28°C | NIGHT CONCENT-RATION TYPE | 0 | 0 | ... | 0.1 | 0.8 | 1.7 | 2.4 | 2.5 | 6.2 | 7.9 | 7.6 | 7.1 | 6.5 | 5.1 | 2.2 | ... | 0 |
| OPERATION PARAMETER 3 | 28°C | ALL-DAY UNIFORM TYPE | 0 | 0 | ... | 1.2 | 4.2 | 6.7 | 7.9 | 8.3 | 8.2 | 7.9 | 7.6 | 7.1 | 6.5 | 6.0 | 4.7 | ... | 0 |
| OPERATION PARAMETER 4 | 26°C | MORNING CONCENT-RATION TYPE | 0 | 0 | ... | 2.0 | 9.2 | 10.9 | 12.8 | 10.8 | 2.7 | 2.6 | 2.5 | 2.3 | 2.1 | 1.2 | 0.0 | ... | 0 |
| OPERATION PARAMETER 4 | 26°C | NIGHT CONCENT-RATION TYPE | 0 | 0 | ... | 0.1 | 1.1 | 2.2 | 3.1 | 3.2 | 8.0 | 10.2 | 9.8 | 9.2 | 8.4 | 6.6 | 2.9 | ... | 0 |
| OPERATION PARAMETER 6 | 26°C | ALL-DAY UNIFORM TYPE | 0 | 0 | ... | 1.5 | 5.5 | 8.7 | 10.3 | 10.8 | 10.7 | 10.2 | 9.8 | 9.2 | 8.4 | 7.8 | 6.1 | ... | 0 |

FIG. 7

| RANK | ITEM | SET TEMPERATURE | POPULATION VARIATION PATTERN | EVALUATION VALUE |
| --- | --- | --- | --- | --- |
| 1 | OPERATION PARAMETER 3 | 28°C | ALL-DAY UNIFORM TYPE | 55.2 |
| 2 | OPERATION PARAMETER 6 | 26°C | ALL-DAY UNIFORM TYPE | 127.2 |
| 3 | OPERATION PARAMETER 2 | 28°C | NIGHT CONCENTRATION TYPE | 154.0 |
| 4 | OPERATION PARAMETER 5 | 26°C | NIGHT CONCENTRATION TYPE | 163.3 |
| 5 | OPERATION PARAMETER 1 | 28°C | MORNING CONCENTRATION TYPE | 206.4 |
| ... | | | | |

FIG. 8

ESTIMATION DEVICE, ESTIMATION METHOD, AND NON-TRANSITORY COMPUTER READABLE MEDIUM

CROSS-REFERENCE TO RELATED APPLICATIONS

This application is based upon and claims the benefit of priority from Japanese Patent Application No. 2015-058652, filed Mar. 20, 2015; the entire contents of which are incorporated herein by reference.

FIELD

Embodiments described herein relate generally to an estimation device, an estimation method, and a non-transitory computer readable medium

BACKGROUND

In recent years, various kinds of efforts have been made for the purpose of efficient use of energy. In facilities such as buildings, efforts to change energy consumption patterns are being made with the purpose of complying with the Revised Energy Conservation Act, gaining LEED (Leadership in Energy and Environmental Design) accreditation, or the like. For example, there are operation changes such as changing a set temperature of air conditioning to achieve energy savings during time periods of large energy consumption, shifting the time to start working to early morning, or, not working overtime in winter because of significant energy consumption by air heating. By these operation changes or the like, it is possible to change the distribution of energy consumption patterns in the facility, and thereby an effect such as peak shift of electrical power or reduction in cost is able to be obtained.

If a relationship between the current status of operations and energy consumption volume of the facility is able to be grasped, effects of energy savings or the like with the operation changes or equipment changes can be quickly and exactly calculated by simulation, and accordingly, effective changes can be carried out. However, it is difficult to grasp the current status of operations. For example, in a building, it is difficult to grasp set temperatures of air conditionings belonging to each tenant, or the number of people during a predetermined time period on each floor. Even if sensing by motion sensors or the like is to be carried out, there is a significant cost to install the sensors. On the other hand, a method to predict energy consumption based on only simple information, such as a history related to energy or equipment information of the building lacks accuracy as compared to prediction by simulation. Therefore, it is required to estimate the current status of operations with high accuracy while keeping the costs low.

BRIEF DESCRIPTION OF THE DRAWINGS

FIGS. 2A and 2B are diagrams showing an example of operation information;

FIGS. 3A and 3B are diagrams showing an example of basic parameters;

FIG. 4 is a diagram showing an example of actual performance data;

FIG. 5 is a diagram showing an example of operation parameters;

FIG. 7 is a diagram showing an example of estimated energy information;

FIG. 8 is a diagram showing ranks of the operation parameters;

DETAILED DESCRIPTION

Figure 1:
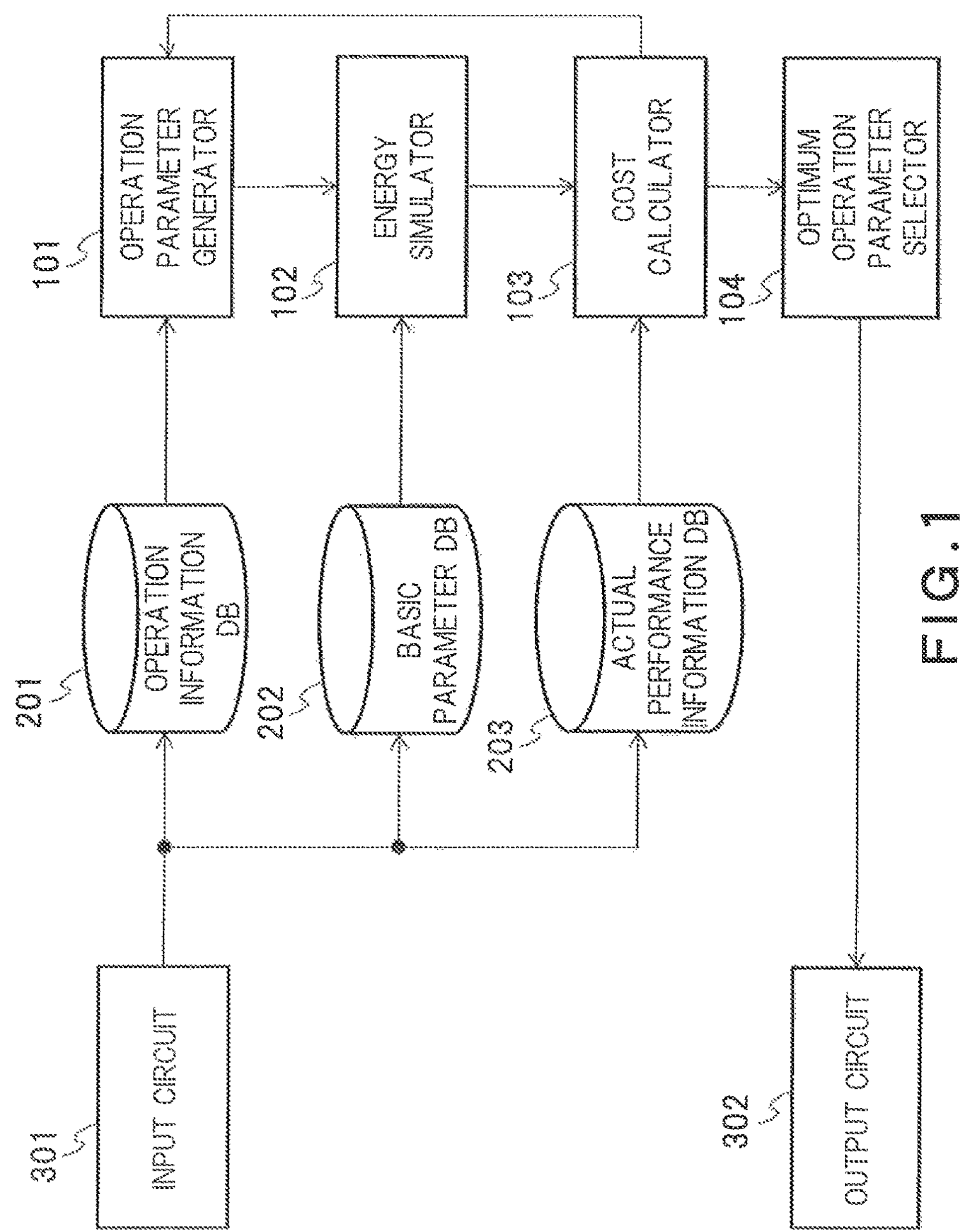
FIG. 1 is a block diagram showing an example of an overall configuration of an estimation device according to a first embodiment.

Embodiments of the present invention will be described below with reference to the drawings. Embodiments described here is an example, and implementation of the present invention is not necessarily limited to the embodiments described here. Further, the same reference numerals are assigned to the same components in the drawings, and overlapped explanation will be omitted as appropriate except processing which is modified or expanded.

According to one embodiment, an estimation device includes a first parameter generator, an energy simulator, a cost calculator, and a parameter selector. The first parameter generator determines values of one or more constituents of one or more first parameters to generate the one or more first parameters, the one or more constituents representing an operation status of a facility. The energy simulator calculates estimation information of energy consumption related to the first parameters by simulating energy consumption of the facility based on the first parameters. The cost calculator calculates evaluation values of the first parameters based on the estimation information of the energy consumption of the facility and actual performance information of the energy consumption of the facility. The parameter selector selects one of the plural first parameters based on the evaluation values.

Below, a description is given of embodiments of the present invention with reference to the drawings.

First Embodiment

FIG. 1 is a block diagram showing an example of an overall configuration of an estimation device according to a first embodiment. The estimation device according to the first embodiment is provided with an operation information DB 201, a basic parameter DB 202, an actual performance information DB 203, an operation parameter generator 101, an energy simulator 102, a cost calculator 103, an optimum operation parameter selector 104, an input circuit 301, and an output circuit 302.

The estimation device according to the first embodiment estimates the current operation status of a facility by the process of each component as described above. Specifically, the estimation device estimates an average set temperature of air conditionings belonging to the facility, time-series variation in the number of people present on each floor or in the facility, time-series variation in power consumption per person, or the like.

Hereinafter, each component will be described.

The operation information DB 201 stores operation information. The operation information is composed of operation items and assumed patterns.

The operation item may be anything that relates to energy consumption in the facility, such as information related to the number of people, action taken by a person, settings of electrical equipment, or the like in the facility. Fuel, heat, electrical power and so on are assumed as the energy; however, other energies may be included. As to the operation item, for example, the time-series variation in the number of people present in the facility, working hours in offices in the facility, and so on, are the information related to energy consumption in the facility because power consumption increases at a period of time in which many people are present. Moreover, since power consumption varies according to changes in the set temperature, the average set temperature of air conditioning in the facility is also the information related to energy consumption in the facility. Alternatively, power consumption per person, a time period in which electrical equipment, such as an air conditioning and an illumination device is used, and so on, can be the operation item.

The assumed pattern includes a value, a range, a type (pattern), or the like which the operation item possibly takes. For a single operation item, plural assumed patterns are defined in advance.

FIGS. 2A and 2B are diagrams showing an example of the operation information. FIG. 2A shows an example of the operation items and the assumed patterns. FIG. 2B shows an example of each assumed pattern represented by a time-series value in the operation item indicating variation in the number of people in the facility, which is called as a population variation pattern.

In FIG. 2A, it is shown that, in the case where the operation item is the set temperature of air conditioning, corresponding assumed patterns are three patterns, 26° C., 27° C. and 28° C. Here, the assumed patterns are supposed to be three; however, the assumed patterns may be arbitrarily determined within the range of possible values.

In the case where the operation item is the power consumption per person, the assumed pattern is represented by a range from 30 W to 300 W. This indicates that the possible value of the assumed pattern may be an arbitrary value within the range from 30 W to 300 W.

In the case where the operation item is the population variation pattern, it is indicated that the assumed patterns are the three patterns, a morning concentration type, a night concentration type and an all-day uniform type. These types are supposed to be defined in advance.

The assumed patterns may be an average value, a maximum value or the like of a day, or may be a possible value in a predetermined time period. For example, in a case where the working hours are 8:00 to 17:00, the assumed pattern may be a possible value taken between 8:00 and 17:00. Moreover, the time of day is divided into plural time periods, and the assumed pattern may be a possible value taken in each of the divided time periods.

FIG. 2B shows the number of people in the facility in each time period in the case where a day is divided by the hour. The morning concentration type is a pattern in which there are a large number of people in the morning time periods from 8:00 to 12:00. The night concentration type is a pattern in which there are a large number of people in the night time periods from 14:00 to 18:00. The all-day uniform type is a pattern in which the population variation is assumed to be small from morning till night. Here, a day is divided by the hour; however, the dividing time length may be arbitrary, and the lengths of the divided time periods may be different from one another. For example, though the daytime is divided by the hour, the nighttime may be divided by three hours. Moreover, the assumed pattern may be expressed by a function, which is continuous data, such as a normal distribution, a rectangular function, a trapezoidal function, or a convex function, not by discrete data.

The basic parameter DB 202 stores the basic parameters. The basic parameters are necessary for the process of the energy simulator 102. Examples of the basic parameters include weather information, load information, facility information, and so forth.

The weather information relates to weather conditions inside and outside the facility. For example, weather, temperature, humidity, illuminance, air flow, rainfall amounts, snow accumulation, or the like are included. The weather information varies as time passes.

The load information relates to energy-consuming equipment belonging to the facility. For example, kinds of equipment, such as air conditioning, illumination or a boiler, specification information, such as a normal output power of equipment, an average energy consumption, a coefficient of performance (COP: Coefficient of Performance) of air conditioning and energy consumption efficiency throughout the year (APF: Annual Performance Factor), and so forth are included.

The facility information relates to the facility. For example, the facility information may include a structure of the facility, such as reinforced concrete structure, lightweight or heavyweight steel structure or the like, a construction method, such as internal wall insulation, external wall insulation or the like, specification of the facility, such as a volume, a floor area, a surface area, an aperture area rate or the like, or values related to heat loss of the facility, such as an amount of heat loss, a thermal transmittance, a thermal resistance, a thermal conductivity, a thermophysical property value, a surface heat transfer resistance, a corrected thermal transmittance or the like.

FIGS. 3A and 3B are diagrams showing an example of basic parameters stored in the basic parameter DB 202. FIG. 3A shows kinds of the basic parameters and values thereof. The types of air conditioning may include VRF (Variable Refrigerant Flow), packaged air conditionings, or the like. The VRF connect multiple indoor appliances to a single outdoor appliance, and are capable of operating each indoor appliance individually. The packaged air conditionings connect multiple indoor appliances to a single outdoor appliance, and are incapable of operating each indoor appliance individually.

FIG. 3B is an example of basic parameters related to the weather information. Information about temperature and weather outside the facility once every hour is shown. Those varies with time, like the weather information, may be shown in each time period.

The actual performance information DB 203 stores information related to energy actually used by the facility (actual performance data). The actual performance data may be the information related to energy, for example, amounts of electrical power, fuel and water actually used in the facility, the operation time of equipment, or the like. FIG. 4 is a diagram showing an example of the actual performance data for plural days expressed in time series divided by the hour. FIG. 4 shows the data on an hourly basis; however, the data may be on a daily basis, a monthly basis, or an average of a predetermined number of days.

The operation parameter generator 101 generates the operation parameters based on the operation information. The operation parameter is one of the parameters necessary for the process of the energy simulator 102. The operation parameter includes one or more operation items as constituents, and values of the constituents are based on assumed patterns.

FIG. 5 is a diagram showing an example of the generated operation parameters. The constituents of the operation parameters shown in FIG. 5 are two selected from the operation items shown in FIG. 2, the set temperature of air conditioning and the population variation pattern. The operation items serving as the constituents may be determined in advance, or may be designated by a user through the input circuit 301. In FIG. 5, two constituents are used for the operation parameters; however, the number of constituents may be an arbitrary if the number of constituents is one or more. The value of each constituent may be an arbitrary.

As the values of the constituents, that is, the assumed patterns used for creation, all of the assumed patterns or a part thereof determined in advance may be used, or assumed patterns may be designated by a user through the input circuit 301. The operation parameter generator 101 determines the values of the constituents of each operation parameter not to generate operation parameters, all of whose constituent values completely match one another. In FIG. 5, all combinations are listed when the values of Constituent 1 are defined to be two, 28° C. and 26° C., and the values of Constituent 2 are defined to be three, the morning concentration type, the night concentration type and the all-day uniform type.

However, if the assumed patterns are increased in number, the operation parameters generated by combination of the assumed patterns are significantly expanded in number. Moreover, in the case where the assumed pattern is represented by a range, it is necessary to determine the value from the range. In order to generate better operation parameters within limited number of operation parameters, the values of the constituents may be determined by the operation parameter generator 101. For example, in the case where the assumed pattern is a range, the operation parameter generator 101 makes a search for a value capable of providing a better result under the condition that the value exists within the range.

Figures 6A, 6B:
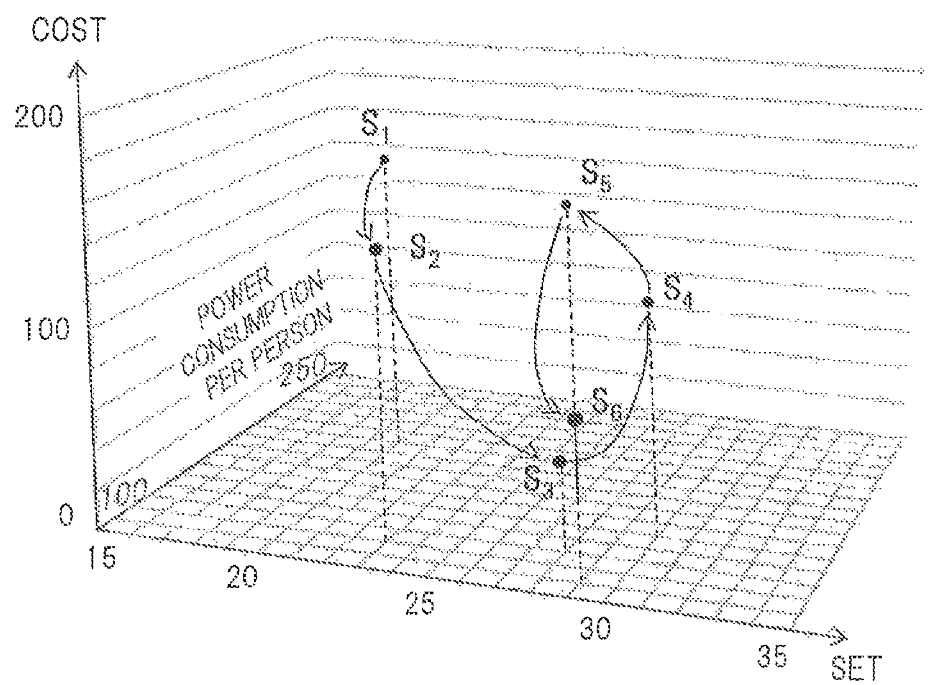
FIGS. 6A and 6B are diagrams showing an example of creation of the operation parameters.

FIGS. 6A and 6B are diagrams showing an example of creation of the operation parameters. FIG. 6A shows a list of the operation parameters generated by the operation parameter generator 101. FIG. 6B shows a three-dimensional diagram, whose vertical axis (x-axis) indicates a set temperature, whose horizontal axis (y-axis) indicates power consumption per person, and whose height axis (z-axis) indicates an evaluation value, in which generated operation parameters are plotted.

The constituents of the operation parameters shown in FIG. 6A are two, the set temperature and the power consumption per person. The assumed patterns are, for the set temperature, the range from 15° C. to 35° C., and for the power consumption per person, the range from 100 W to 250 W. Note that the first operation parameter is represented as an initial parameter "$S_1$", and the n-th (n is a positive integer) operation parameter is represented as "$S_n$".

The value of each constituent of the initial operation parameter "$S_1$" generated by the operation parameter generator 101 is 20.0° C. for the set temperature, and 200 W for the power consumption per person. Moreover, suppose that the evaluation value of the parameter "$S_1$" is calculated to be 200.3 by the process of a cost calculator to be described later. The operation parameter generator 101 determines the value of each constituent of a new parameter "$S_2$". For example, the value of each constituent of the new parameter "$S_2$" is determined to decrease the evaluation value. As a specific example, the value of the constituent of the operation parameter "$S_2$" is determined by randomly increasing or decreasing the value of the constituent of the operation parameter "$S_1$" within the range of the assumed pattern. Suppose that the new evaluation value of the operation parameter "$S_2$" calculated by the cost calculator is 180.3, which is decreased as compared to "$S_1$". Based on the result that the evaluation value is decreased, the operation parameter generator 101 determines the value of the constituent of the next operation parameter "$S_3$". Note that there is of course a case in which it is uncertain how the value of the constituent is moved to decrease the evaluation value, and in such a case, the value may be determined by an arbitrary method, such as randomly moving the value of the constituent.

The operation parameter generator 101 gains an optimum value (or a suboptimal value) of the constituent of the operation parameter by repeating the search based on the evaluation value. The search may be repeated for the predetermined number of times, or until the evaluation value becomes not more than a predetermined threshold.

The operation parameter generator 101 may also use an optimization algorithm, such as a gradient method, a GA (Genetic Algorithm) method, an SA (Simulated Annealing) method, or a downhill simplex method. There is a possibility of obtaining the optimum value (or the suboptimal value) more exactly, more rapidly by fewer attempts by use of these algorithms.

The energy simulator 102 predicts energy consumption based on the basic parameters and the operation parameters. The predicted value is referred to as estimated energy information. An existing simulator, such as Energy Plus that is made public by the United States Department of Energy may be used as the simulator. A model, such as a model that degenerates a simulation model and represents a simple physical model, a regression model focusing only on a mathematical relationship between a parameter and energy consumption without using physical properties, or the like, may be used.

FIG. 7 is a diagram showing an example of the estimated energy information for plural days expressed in time series divided by the hour. Similar to the actual performance data, the estimated energy information in FIG. 7 shows numerical values in the time periods divided by the hour; however, the length of the time period may be arbitrarily determined. Moreover, not the data on an hourly basis, but the data collected on a daily basis, a monthly basis, for a predetermined number of days, or an average or the like may be used.

The cost calculator 103 calculates the evaluation value that evaluates the operation parameter. The evaluation value can be obtained based on the estimated energy information and the actually measured value of the power consumption. For example, a square error, an absolute error, MAX norm or the like can be used.

The following expression expresses the evaluation value by the square error. Suppose that the actually measured value of the power consumption at the time t (t is a positive real number) is $x_t$, and the estimated energy information at the time t is $y_t$. T is a set of time and means that $T=\{t_1, t_2, t_3, \ldots, t_{max}\}$ (max is an integer not less than 1).

$$\sum_{t \in T} (x_t - y_t)^2 \quad \text{[Equation 1]}$$

The optimum operation parameter selector 104 determines that the operation parameter of the least evaluation value is optimum based on the evaluation value calculated by the cost calculator 103. Moreover, the optimum operation parameter selector 104 not only returns the optimum operation parameter as the result, but may also rank the operation parameters based on the evaluation values.

FIG. 8 is a diagram showing the ranks of the operation parameters calculated by the optimum operation parameter selector 104. The evaluation value of each operation parameter is shown. The operation parameters are ranked in the ascending order of the evaluation values. The rank 1 is the optimum operation parameter.

Note that the functions of the operation parameter generator 101, the energy simulator 102, the cost calculator 103 and the optimum operation parameter selector 104 are implemented by a mathematical programming solver, which is software capable of solving a mathematical programming problem. In the examples of the mathematical programming solver, ILOG CPLEX, a registered trademark of International Business Machines Corp., and so forth are included.

In the case where the mathematical programming solver is used, the optimum (or the suboptimal) operation parameter can be obtained by providing the following equation to the mathematical programming solver.

$$\min \sum_{t \in T} (x_t - y_t)^2 \quad \text{[Equation 2]}$$

$$\text{s.t. } (y_1, y_2, y_3, \ldots, y_{max}) = f(z)\ (z \in Z)$$

Similar to Expression 1, $x_t$ is the actually measured value of the power consumption at the time t, $y_t$ is the estimated energy information at the time t, T is a set of time and means that $T=\{t_1, t_2, t_3, \ldots, t_{max}\}$. Moreover, z is an operation parameter, Z is a set of operation parameters, and the equality $Z=\{z_1, z_2, z_3, \ldots, z_{max}\}$ holds. The function f (z) is a function to obtain estimated energy information y with respect to the operation parameter z. The function f (z) corresponds to a simulator.

The above-described "min" intends to minimize the equation (objective function) on the right side of "min". The above-described "s. t." intends that the expression on the right side of "s. t." is a constraint condition of the objective function. In other words, for each operation parameter z, $\{y_1, y_2, y_3, \ldots, y_{max}\}$ calculated by f (z) is substituted into the objective function, to thereby obtain z by which the objective function is minimized.

The input circuit 301 accepts input information from a user and transmits information which the input circuit 301 stores to each of the operation information DB 201, the basic parameter DB 202 and the actual performance information DB 203. Note that the input may be from other systems, such as a not-shown energy measurement system or the like, not from a user.

The output circuit 302 outputs information, such as the obtained optimum operation parameter, the estimated energy information based on the optimum operation parameter, a comparative diagram that compares the estimated energy information with the actually measured values, or the like. The outputted information may be displayed as an image, or stored as an electronic file.

Figure 9:
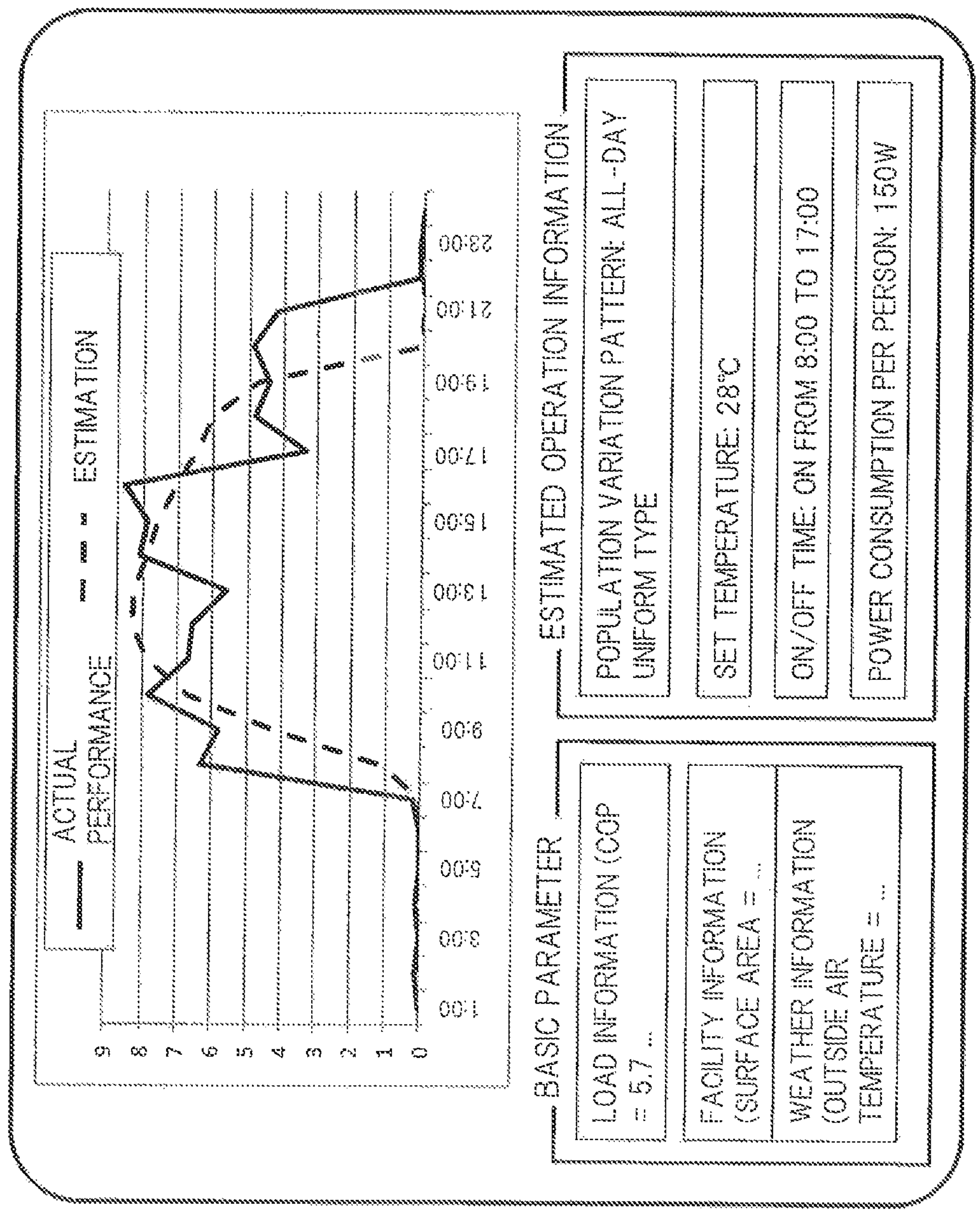
FIG. 9 is a diagram showing an example of an output from an output circuit.

FIG. 9 is a diagram showing an example of an output from the output circuit 302. In FIG. 9, the solid line graph indicates the actual performance data, and the dotted line graph is according to the estimated energy information based on the optimum operation parameter. Moreover, the basic parameter used in simulation and the operation information which is the basis for the operation parameter are outputted. These information items may be shown solely or in combination. Moreover, the graph is used here; however, a rank table as shown in FIG. 8 may be outputted.

Figure 10:
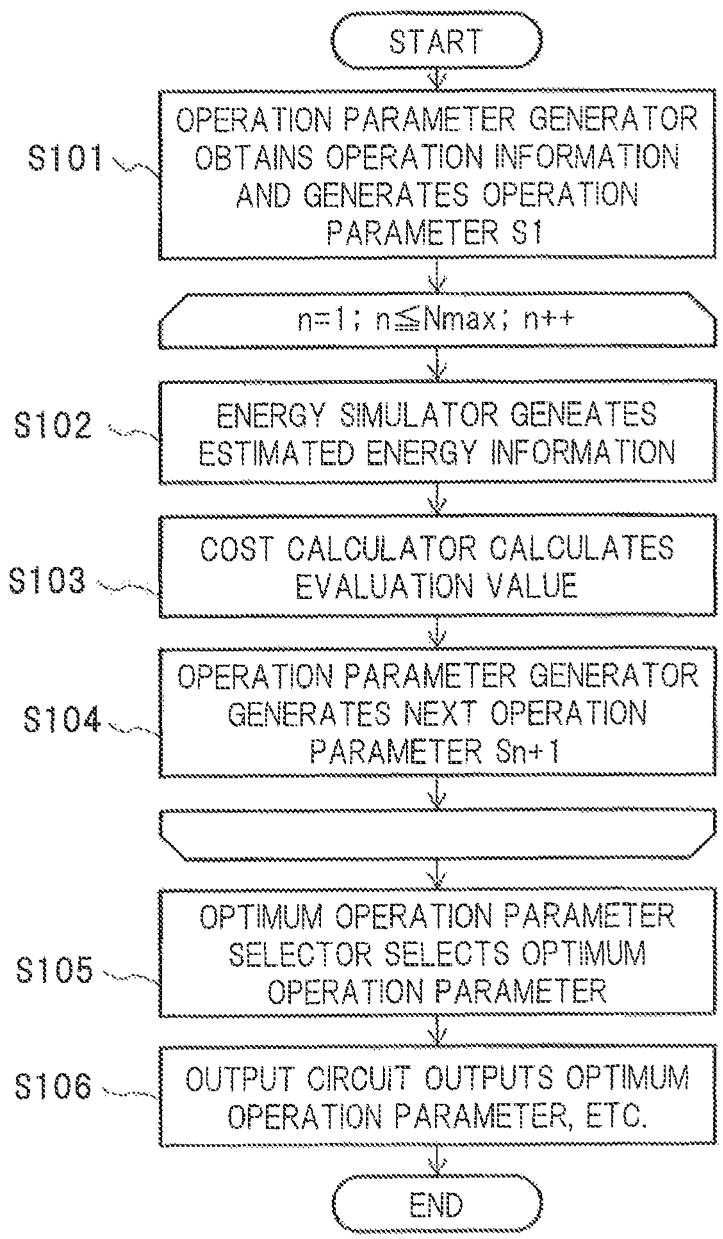
FIG. 10 is a flowchart showing a process of the estimation device according to the first embodiment.

Next, a process of the estimation device according to the first embodiment will be described. FIG. 10 is a flowchart showing the process of the estimation device according to the first embodiment. In the flowchart, a case is assumed in which the operation parameter generator 101 determines a value of each constituent of the operation parameter. The timing of starting the flow may be arbitrary. The flow may be automatically started at a predetermined timing, or a designation may be provided to start the process from the input circuit 301.

The operation parameter generator 101 obtains needed operation information from the operation information DB 201, and generates a first operation parameter (S101). The value of each constituent of "$S_1$" may be randomly selected from the assumed patterns, selected in accordance with expected values, assignment of weights, or the like of the assumed patterns, or determined in advance.

The energy simulator 102 obtains the operation parameter "$S_n$" from the operation parameter generator 101 and needed basic parameters from the basic parameter DB 202, and performs simulation, to thereby generate the estimated energy information, which is a result of the simulation (S102).

The cost calculator 103 obtains the estimated energy information from the energy simulator 102 and actual power performance information from the actual performance information DB 203, and calculates the evaluation value based on the actual power performance information and the estimated energy information (S103).

The operation parameter generator 101 changes the value of each constituent based on the evaluation value of the cost calculator 103, and generates a next new parameter "$S_{n+1}$" (S104).

The processes of the steps from S102 to S104 are performed Nmax times (Nmax is a predetermined positive integer). Note that, in a case where certain conditions are satisfied, the loop can be finished without being repeated Nmax times. For example, there is a condition such that the evaluation value calculated by the cost calculator 103 is not more than a predetermined threshold.

The optimum operation parameter selector 104 obtains evaluation values of all the operation parameters from the cost calculator 103, and determines the operation parameter of the least evaluation value as the optimum operation parameter (S105). Note that, in a case where the optimum operation parameter selector 104 calculates only the optimum operation parameter and it is unnecessary to rank the operation parameters, the process of S105 may be, similar to the processes of S102 to S104, included in the loop. Specifically, the optimum operation parameter selector 104 compares the calculated evaluation value of the operation parameter with the current least evaluation value, and if the calculated evaluation value is less than the current least evaluation value, the least evaluation value is renewed to the calculated evaluation value.

The output circuit 302 receives the optimum operation parameter from the optimum operation parameter selector 104 and the operation information or the like related to the operation parameter and outputs thereof (S105). The above is the flowchart in the first embodiment.

Note that, in the flowchart, the operation parameter generator 101 obtains a cost evaluation value of an operation parameter every time the operation parameter is generated, and generates a next operation parameter. However, in a case where the assumed patterns to be used as the values of the constituents are determined in advance, the operation parameter generator 101 may transmit all the operation parameters to the energy simulator after the operation parameter generator 101 finished creating all the operation parameters.

As described above, according to the first embodiment, it is possible to estimate the most probable assumed patterns among the plural assumed patterns determined in advance by use of merely a part of sensor data without making investigation of the current operation status with a sensor or the like. This makes it possible to grasp the current operation status at low cost.

Second Embodiment

Figure 11:
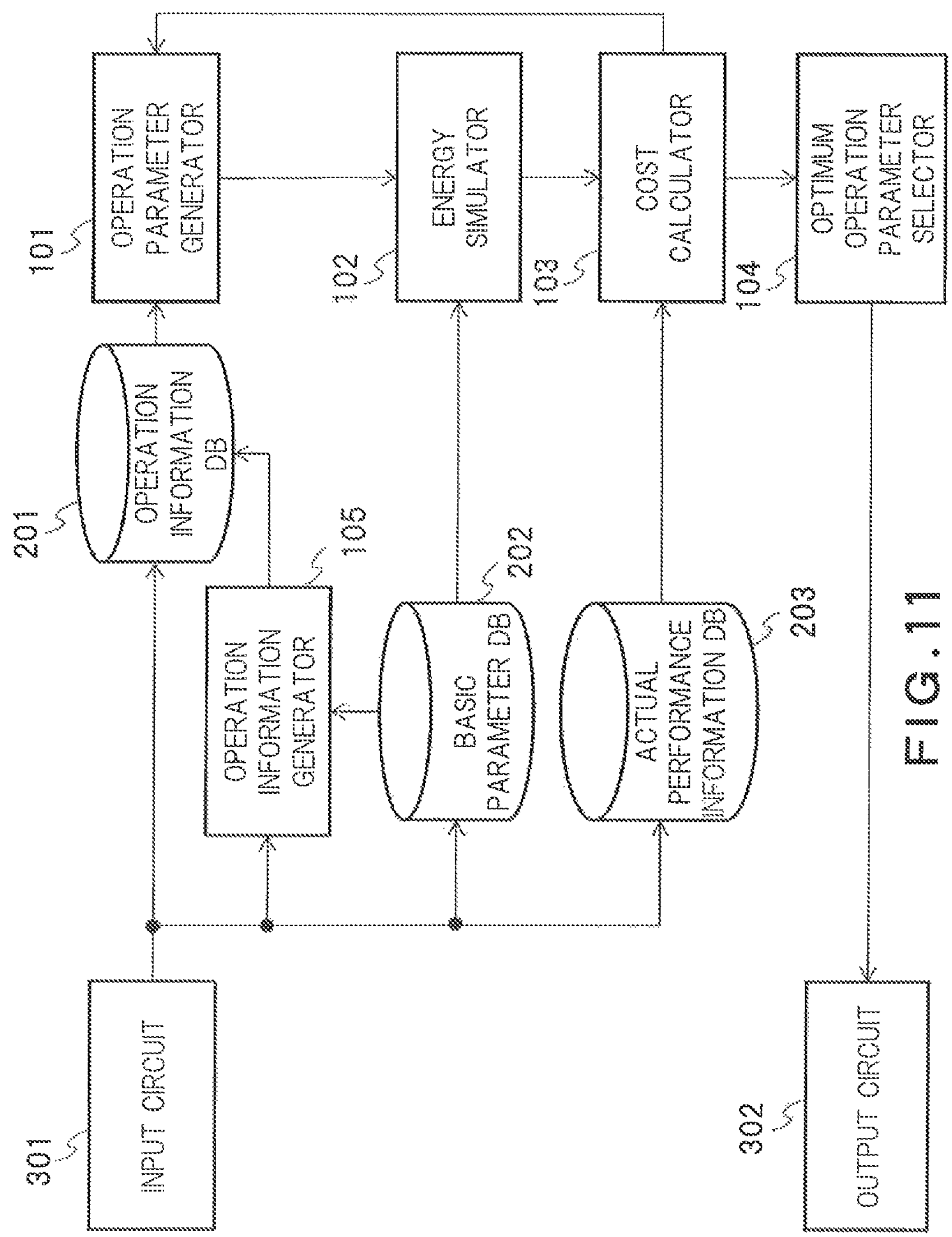
FIG. 11 is a block diagram showing an example of an overall configuration of an estimation device according to a second embodiment.

Next, a second embodiment will be described. Description that overlaps the first embodiment will be omitted. FIG. 11 is a block diagram showing an example of an overall configuration of an estimation device according to the second embodiment. In the second embodiment, an operation information generator 105 is added to the configuration of the first embodiment.

The operation information generator 105 newly generates operation information. The generated operation information is transmitted to the operation information DB 201 and stored. The stored operation information is handled similarly to the operation information in the first embodiment.

The information used for creation is information related to the facility. For example, the information includes the purpose of use, the scale and the size of the facility, and also the total number of people who use the facility in a day. In a case where the purpose of use of the facility is an office building, there is a high possibility that variations in the energy consumption per person and the energy consumption in time periods are similar to those of other office buildings. Moreover, there is a high possibility that the total energy consumption of the facility is similar to that of a facility of the same level in size of the facility or in the total number of people who use the building.

The operation information generator 105 may receive the information used for creation from the input circuit 301, or may obtain the information from the basic parameter DB 202.

As the creation method, for example, the assumed patterns of the operation information may be generated by preparing predetermined formats and automatically determining values to be input the formats based on input information. For instance, in a case where the total number of people who use the facility in a day is inputted, it is considered that the number of people in the facility in each time period is assumed by use of a normal distribution and random numbers. Moreover, in a case where the purpose of use of the facility is a restaurant, it is considered that a distribution having peaks in the time period from 12:00 to 13:00 and the time period from 18:00 to 19:00 is generated to assume the number of people in the facility.

Moreover, data of other facilities may be used. For example, according to input values of facility scale or the number of people using the facility, a facility of a similar level in scale or a facility of similar condition of use may be extracted, to thereby use the data of the facility. The value of the data to be used may be as it is, or may be processed by using random numbers or by multiplying the scale rate. Moreover, an average value of data of plural similar facilities may be used.

The data of other facilities may be held by the operation information generator 105, the actual performance information DB 203 or a not-shown different database, or may be obtained from other systems through the input circuit.

Figure 12:
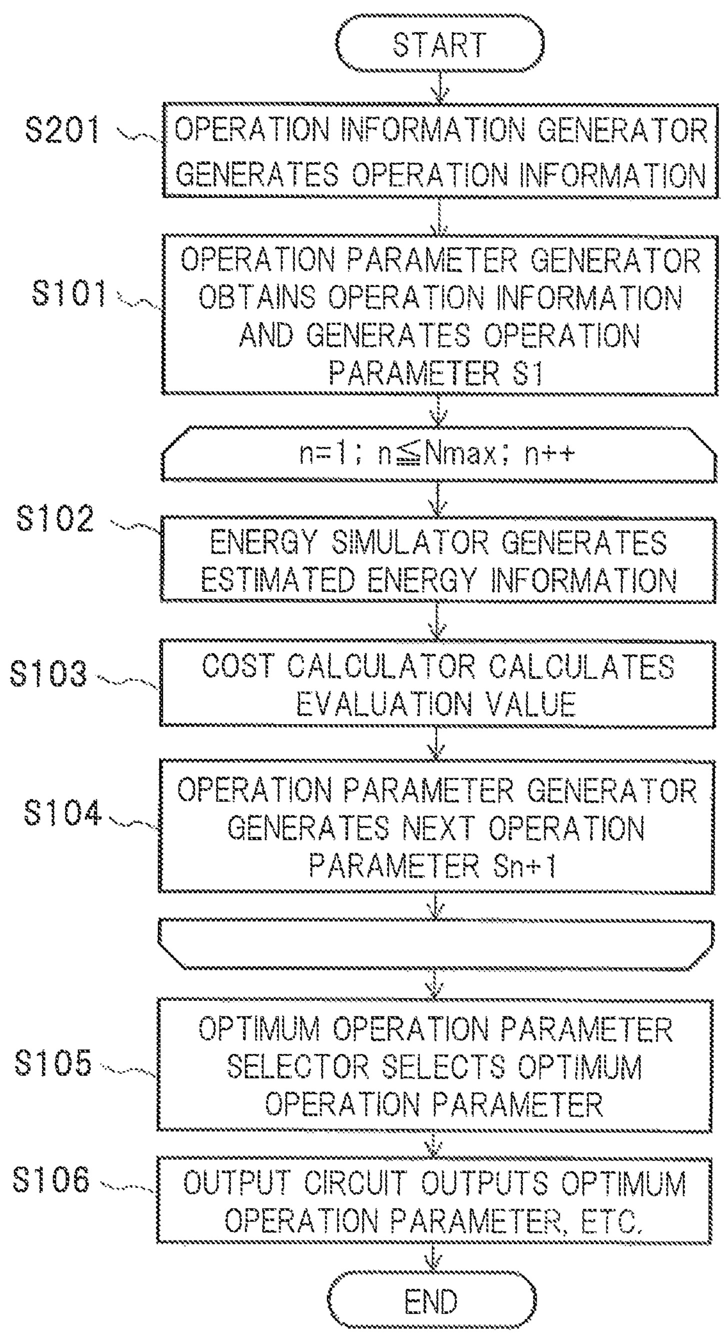
FIG. 12 is a flowchart showing a process of the estimation device according to the second embodiment.

Next, a process of the estimation device according to the second embodiment will be described. FIG. 12 is a flowchart showing the process of the estimation device according to the second embodiment. Prior to the process of the estimation device according to the first embodiment, the process of the operation information generator 105 is inserted.

The operation information generator 105 generates operation information (S201). The timing of execution may be arbitrary in the case where the information necessary for creation is obtained from the basic parameter DB 202. In the case where the information is received from the input circuit 301, the process may be executed at the timing of receiving the information. The generated operation information is transmitted to the operation information DB 201 and stored (S202).

The subsequent processes are similar to those of the first embodiment.

As described above, according to the second embodiment, it is possible to generate complicated operation information from the basic information of the facility. Therefore, the user's load of creating operation information corresponding to the facility can be reduced. Moreover, by use of the data of the similar facility, it is possible to increase accuracy of the operation information and reduce the time to generate the operation parameters.

Each process in the embodiments described above can be implemented by software (program). Thus, the estimation device in the embodiments described above can be implemented using, for example, a general-purpose computer apparatus as basic hardware and causing a processor mounted in the computer apparatus to execute the program.

Figure 13:
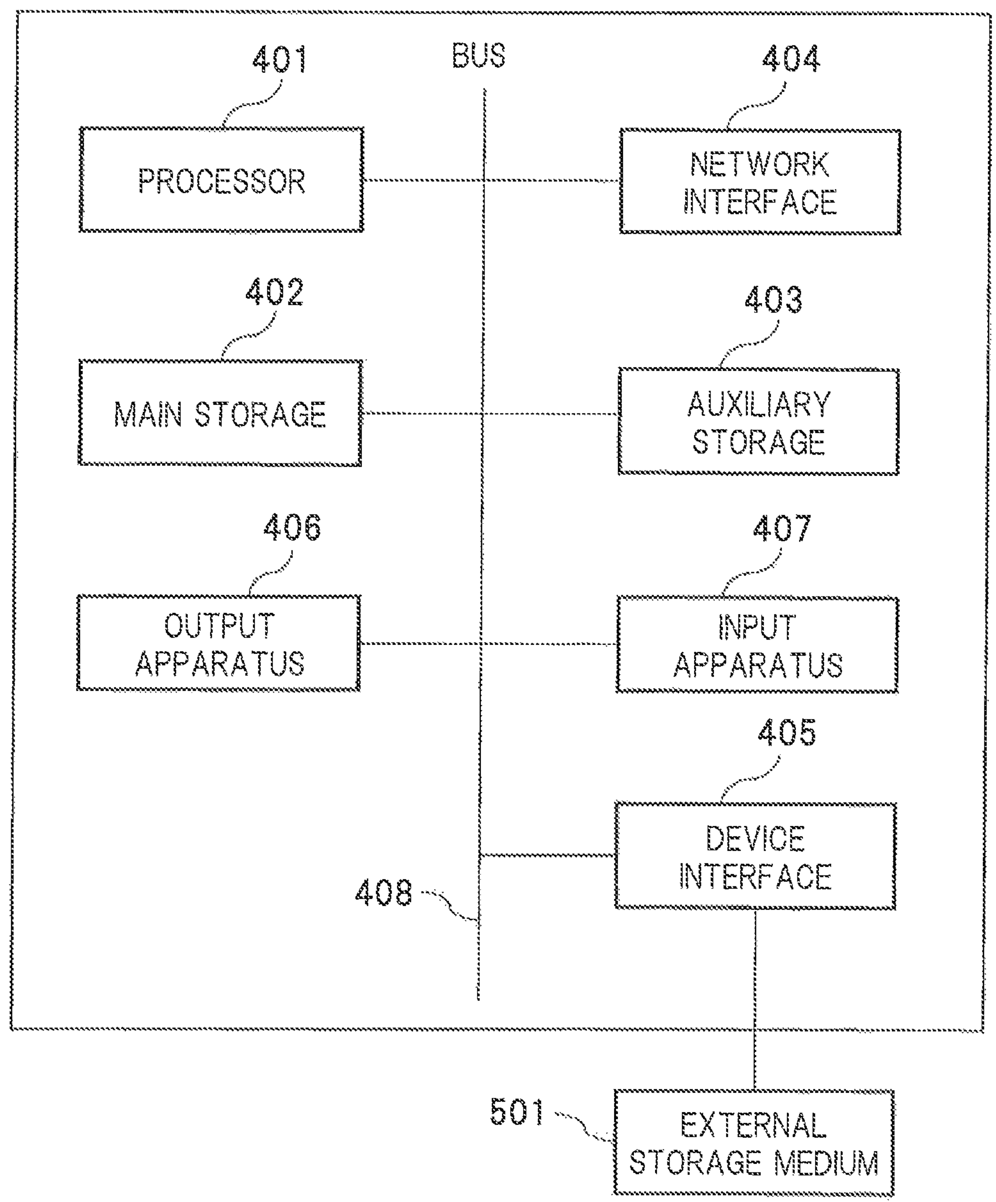
FIG. 13 is a block diagram showing an example of a hardware configuration according to an embodiment of the present invention.

FIG. 13 is a block diagram showing an example of a hardware configuration according to an embodiment of the present invention.

The estimation device can be implemented as a computer apparatus provided with a processor 401, a main storage 402, an auxiliary storage 403, a network interface 604, a device interface 405, an output apparatus 406, and an input apparatus 407, with these components being interconnected via a bus 408.

The processor 401 reads a program from the auxiliary storage 403, develops and executes the program on the main storage 402, and can thereby implement functions of the operation parameter generator 101, the energy simulator 102, the cost calculator 103, the optimum operation parameter selector 104 and the operation information generator 105.

The estimation device of the embodiment may also be implemented by preinstalling a program to be executed by the estimation device in the computer apparatus, or by appropriately installing the program stored in a storage medium, such as a CD-ROM, or distributed through a network.

The network interface 404 is an interface to connect the communication network. When the estimation device is connected to the Input circuit 301, the output circuit 302 or the like via communication, the connection may be implemented by the network interface 404. Here, although only a single network interface is shown, plural network interfaces may be mounted.

The device interface 405 is an interface to connect an appliance, such as an external storage medium 501. The external storage medium 501 may be an arbitrary storage medium, such as an HDD, CD-R, CD-RW, DVD-RAM, DVD-R, SAN (Storage Area Network) or the like. The operation information DB 201, the basic parameter DB 202 and the actual performance information DB 203 may be connected as the external storage medium 501 to the device interface 405.

The output apparatus 406 is configured with a display, such as an LCD (Liquid Crystal Display) or CRT (Cathode Ray Tube), to thereby implement the function of the output circuit 302.

The input apparatus 407 includes an input device such as a keyboard, a mouse, or a touch panel, to thereby implement the function of the input circuit 301. An operation signal from the input circuit 301, which is generated by operating an input device, is outputted to the processor 401. The input apparatus 407 or the output apparatus 406 may be connected to the device interface 405 from outside.

The main storage 402 is a memory for temporarily storing instructions to be executed by the processor 401 and various kinds of data, which may be a volatile memory, such as DRAM, or a non-volatile memory, such as MRAM. The auxiliary storage 403 is a storage for permanently storing programs or data, which is, for example, an HDD or SSD. The data held by the operation information DB 201, the basic parameter DB 202, the actual performance information DB 203, or the like are stored in the main storage 402, the auxiliary storage 403 or the external storage medium.

Note that a printer for printing information from the various kinds of DBs or the output circuit 302 may be added to the above-described configuration. Moreover, the configuration of the estimation device may be changed as necessary.

The terms used in each embodiment should be interpreted broadly. For example, the term "processor" may encompass a general purpose processor, a central processor (CPU), a microprocessor, a digital signal processor (DSP), a controller, a microcontroller, a state machine, and so on. According to circumstances, a "processor" may refer to an application specific integrated circuit (ASIC), a field programmable gate array (FPGA), and a programmable logic device (PLD), etc. The term "processor" may refer to a combination of processing devices such as a plurality of microprocessors, a combination of a DSP and a microprocessor, one or more microprocessors in conjunction with a DSP core.

As another example, the term "storage" or "storage device" employed in the embodiments may encompass any electronic component which can store electronic information. The "storage" or "storage device" may refer to various types of media such as random access memory (RAM), read-only memory (ROM), programmable read-only memory (PROM), erasable programmable read only memory (EPROM), electrically erasable PROM (EEPROM), non-volatile random access memory (NVRAM), flash memory, magnetic such as an HDD, an optical disc or SSD.

It can be said that the storage electronically communicates with a processor if the processor read and/or write information for the storage. The storage may be integrated to a processor and also in this case, it can be said that the storage electronically communication with the processor.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An estimation device estimating an operation status of a facility, the estimation device comprising:

a first parameter generator that generates a plurality of first parameters respectively representing different operation statuses of the facility by changing values of one or more constituents of each of the first parameters into values representing an assumed operation status of the facility;

an energy simulator that calculates estimation information of energy consumption related to the first parameters by simulating energy consumption of the facility based on the first parameters;

a cost calculator that calculates evaluation values of the first parameters based on the estimation information of the energy consumption of the facility and actual performance information of the energy consumption of the facility; and a parameter selector that selects one of the plurality of first parameters based on each of the evaluation values of the plurality of first parameters, wherein the estimation device regards an operation status according to the selected first parameter as the operation status of the facility.

2. The estimation device according to claim 1, wherein one of the constituents represents a value in each of time periods generated by dividing a day by constant or different time lengths.

3. The estimation device according to claim 1, wherein one of the constituents at least represents the number of people present in the facility or a status of equipment belonging to the facility.

4. The estimation device according to claim 1, wherein the energy simulator performs simulation of the energy consumption of the facility by further using a second parameter that represents basic information of the facility.

5. The estimation device according to claim 1, wherein the basic information includes at least one of weather information, information related to a structure of the facility, and information related to equipment belonging to the facility.

6. The estimation device according to claim 1, wherein a condition for determining the value of the constituent is set for each of the constituents, and the first parameter generator determines the value of the constituent based on the condition.

7. The estimation device according to claim 1, further comprising:

an operation information generator that generates a constituent and a condition for determining the value of the constituent based on information related to the facility, wherein the first parameter includes the constituent generated by the operation information generator.

8. The estimation device according to claim 1, wherein information representing an estimated operation status of the facility is outputted based on the first parameter selected by the parameter selector.

9. An estimation method executed by a computer, comprising:

generating a plurality of first parameters respectively representing different operation statuses of the facility by changing values of one or more constituents of each of the first parameters into values representing an assumed operation status of the facility;

calculating estimation information of energy consumption related to the first parameters by simulating energy consumption of the facility based on the first parameters;

calculating evaluation values of the first parameters based on the estimation information of the energy consumption of the facility and actual performance information of the energy consumption of the facility; and selecting one of the plurality of first parameters based on each of the evaluation values of the plurality of first parameters, wherein an operation status according to the selected first parameter is regarded as the operation status of the facility.

10. A non-transitory computer readable medium having a computer program stored therein which causes a computer when executed by the computer, to perform processes comprising:

generating a plurality of first parameters respectively representing different operation statuses of the facility by changing values of one or more constituents of each of the first parameters into values representing an assumed operation status of the facility;

calculating estimation information of energy consumption related to the first parameters by simulating energy consumption of the facility based on the first parameters;

calculating evaluation values of the first parameters based on the estimation information of the energy consumption of the facility and actual performance information of the energy consumption of the facility; and selecting one of the plurality of first parameters based on each of the evaluation values of the plurality of first parameters, wherein an operation status according to the selected first parameter is regarded as the operation status of the facility.

* * * * *